United States Patent [19]

Brever et al.

[11] 3,946,115
[45] Mar. 23, 1976

[54] HIGH PERFORMANCE HORSE FEED AND METHOD OF MAKING

[75] Inventors: Leslie H. Brever, Alhambra, Ill.; Frederick H. Steinke, Crestwood, Mo.

[73] Assignee: Ralston Purina Company, St. Louis, Mo.

[22] Filed: July 10, 1974

[21] Appl. No.: 487,077

[52] U.S. Cl. ...................... 426/72; 426/73; 426/89; 426/302; 426/623
[51] Int. Cl.² ............................................ A23K 1/18
[58] Field of Search ........... 426/72, 73, 89, 99, 199, 426/208, 302, 311, 362, 374, 805, 615, 623

[56] References Cited
UNITED STATES PATENTS
3,119,691 1/1964 Ludington et al. .................. 426/99

OTHER PUBLICATIONS

"The Condensed Chemical Dictionary," 8th Edition, Published by Van Hostrand Reinhold Co., New York, p. 221, Article Entitled *Cobalt*.

*Primary Examiner*—Joseph M. Golian
*Attorney, Agent, or Firm*—Veo Peoples, Jr.

[57] ABSTRACT

The present invention is an extruded horse feed having size, shape, surface texture, and ingredient constituency which characterize unexpectedly good palatability and increased available energy supply such that the feed is uniquely capable of improving the consistency of horses' performance.

8 Claims, No Drawings

HIGH PERFORMANCE HORSE FEED AND METHOD OF MAKING

BACKGROUND OF THE INVENTION

This invention relates to a novel, extruded horse feed which is particularly advantageous for high-performance horses. The extrusion of certain animal feeds is well known. For example, dry feeds for dogs, cats, fish and monkeys have been extruded under high pressures and temperatures to produce expanded feeds. These feeds generally contain a significant amount of animal byproducts and other constituents from the animals' ordinary nonextruded ration. On the other hand, feeds for livestock such as cattle, goats, sheep and horses have heretofore not been commercially acceptable.

Generally, extrusion of livestock feeds has been avoided for two reasons. First, there are severe problems which result if the same constituents for the livestock's ordinary ration are utilized in an extruded feed. For examples, molasses which is frequently used to enhance palatability of a non-extruded horse ration will cause undue slippage in the extrusion die, an undesirable puffing of the product and will decrease palatability of the extruded feed. Likewise, oat hulls and alfalfa, which are frequently found in non-extruded horse feeds will impart a rough, grainy or gritty surface texture to an extruded feed which lessens palatability. Second, the extrusion process is relatively expensive, yet there were heretofore no apparent advantages which would outweigh this consideration.

In regard to the latter problem, extrusion is generally advantageous because its inherent cooking aids in improving the digestibility of the feed. Many carnivorous animals, for which extruded feeds have been produced, lack the facility for internally synthesizing low grade protein and for breaking down crude farinaceous materials into useful forms of sugar and starch unless such materials are well-cooked. Ordinarily, carnivorous animals prey upon other animals whose digestive tracts, like that of horses, will break down vegetables, vegetable by-products and other farinaceous materials prior to consumption by the carnivorous animals. For example, the caecum and large intestine of horses is capable of synthesizing some good quality protein while canines and felines lack such capacity.

Nevertheless, it has been herein discovered that there is a considerable and novel advantage in manufacturing an extruded feed for one type of livestock animal — horses. For example, horses as a general rule are sensitive, finicky, and spirited animals. These traits represent particularly acute problems with respect to high-performance horses. For example, race horses of all types, including harness and fine-harness horses, also show or exhibition horses of all kinds, as well as jumpers, and even rodeo and hard-working cutting horses on ranches undergo constant strain and/or stress. These stresses affect eating behavior and feed requirements. As a consequence, the owners of such horses have been trapped in quite a dilemma. That is, in spite of the horses' high caloric needs, their sensitivity all too often does not permit them to consume a nutritionally adequate amount of feed. Accordingly, the owner must accept either inconsistent performance or interruption in scheduled competition and/or work to allow horses to regain suitable condition.

Attempts to solve this problem range a gamut of from adding sweeteners and other exotic liquid and solid supplements to injecting various drugs to completely withdrawing the horses from competition, work and the public for extended periods of time, none of which are satisfactory.

Accordingly, a high-performance horse feed which would provide the requisite energy and nutritional needs of such animals in a form readily acceptable to the horses and in the bulk amount normally consumed spontaneously even after periods of excessive stress or strain would represent a considerable advancement in the art.

SUMMARY OF THE INVENTION

In the process of formulating and producing a high-performance ration for horses, applicants have discovered a unique combination of factors which give an unexpected and greatly enhanced palatability and increased available energy supply in a horse feed. Thus, it is possible to process a formulation which contains materials of normally lower palatability than, for example, molasses, etc., in a manner that makes the materials more palatable and energetic.

The process involves mixing and finely grinding proteinaceous, farinaceous, fibrous and other nutritional materials. The mixed ground material is then extruded to form slightly puffed, expanded material and cut to form shaped particles. The particles are coated with a uniform layer of vegetable oil. The conditions of extrusion and cut off are controlled to produce a product which has a bulk density of above 32 lbs. per bushel and preferably about 35 to 42 lbs. per bushel and which has a smooth texture with minimal rough surface projections. The particles are formed by the die shape and cut off to have a length of not more than 3 inches. The product will preferably have an oval or oat shape.

It is an object of the present invention to provide a feed which contains significantly higher levels of energy than oats or other conventional horse feeds by virtue of a composite of higher energy ingredients, although in unexpectedly low amounts, and improved processing without the necessity of extraneous multiple additions of various supplements or additives individually.

It is a further object of this invention to provide a feed which can be readily dry mixed in the grain portion of the horses' diet with no discernible distraction from, for example, oats.

It is also an object of the present invention to provide a feed which has a greater composite effect on improving the consistency of horses' performance than that of the ingredients if added individually.

These and other objects will become apparent from the following description of preferred embodiments.

DESCRIPTION OF THE PREFERRED EMBODIMENTS

Applicants, in the course of producing an extruded horse feed, discovered that they had inadvertently produced a feed which had better palatability and a greater supply of available energy than the conventional highly palatable standard high performance horse feeds. This result was quite unexpected since the feed contains less of the generally accepted extra palatability factors found in standard maintenance feeds. In seeking to determine why the feed exhibited such unexpected palatability and improved performance, applicants have discovered a unique combination of factors. By using applicants' unique combination of factors, it is possible to process a formulation for high-performance horses from relatively low palatability ingredients, which process effectively upgrades the palatability and available energy to an unexpectedly high level.

The concept of this invention pertains to a unique feed and method of making the same. Generally, a feed is produced from particular farinaceous, proteinaceous and fibrous sources with additional vitamin and mineral supplements as needed to make the feed nutritionally complete. The product is highly palatable and nutritionally superior either when feed alone or when fed mixed with other feeds.

The farinaceous components of the present invention are preferably corn, wheat, flour, wheat meal by-products, wheat and wheat middlings. In spite of the long felt belief and conventional practice of utilizing oats as the primary or preferred grain source of starch for horses, it has been discovered that oats are not necessary nor preferred for purposes of applicants' invention. The underlying reason for this is not precisely understood. In the present invention, even though corn and wheat are ordinarily less palatable to horses than oats in an unprocessed feed, the corn, wheat and wheat middlings when processed are significantly more palatable than are oats when processed in the same manner. The total amount of the farinaceous material of this invention ranges from 35 to about 65% by weight based on the overall weight of the final product. However, it is preferred to use from 40 to 50%.

The proteinaceous material needs to be a source high quality protein. One might except that, by virtue of the horses' ability to manufacture some good quality protein in its caecum or large intestine, the horse has no particular need for additional high quality protein nor for well processed extruded feed. But this is not the case. Applicants have unexpectedly discovered that the source of protein is critical in accomplishing the advantages of the present invention. Examples of suitable proteinaceous materials are legume seed meals such as soybean meal, soy flour, peanut meal, rape seed meal, cottenseed meal, safflower seed meal and mixtures thereof. Meat and fish scraps, although high in protein and frequently used in other extruded feeds, have no utility in the applicants' formulation. Their palatability to horses is low in the extruded product. It is particularly preferred for convenience, economy and efficiency to utilize soybean meal as the proteinaceous material. The amount of proteinaceous material utilized is from about 10 to about 30% by weight of the final product and preferably from 20 to about 25%.

The fibrous material is required in order to provide adequate structural strength or integrity to the final feed pellets and also to effect stool normality. Although oat hulls and alfalfa are conventionally utilized for their fiber in nonextruded horse feeds, such materials lack the requisite palatability for applicants' extruded feed. These materials cause a rough grainy or gritty surface texture in the pellets which is apparently offensive to horses. It is not understood why such effect is only prevalent in the extruded feed but the fact remains that it is. Accordingly, it has been unexpectedly discovered that soybean hulls, rice hulls and cottenseed hulls are the preferred fibrous material of the present invention in spite of their lower palatability in non-extruded feeds. Soybean hulls are particularly preferred. The amount of fibrous material may be from about 5 to about 30% by weight of the final product; however, it is preferred to use 15%.

The nutritional supplements of the present invention are the fat soluble and water soluble vitamins and minerals which are nutritionally advantageous to high performance horses. Typical ones are vitamins A, D, E and the B vitamins, riboflavin, niacin, thiamine, biotin, pantothenic, choline, pyridoxine, and also ascorbic acid, and calcium, phosphorus, copper, iron, manganese, iodine, zinc, cobalt, salts such as sodium chloride and combinations thereof. The nutritional supplements are utilized in an overall amount of from about 3 to 4 by weight of the feed.

In the process of this invention, the above-described farinaceous, proteinaceous, fibrous and nutritional ingredients are uniformly mixed and finely ground. The materials may be ground separately or they may be mixed prior to grinding. If desired, small amounts of vegetable oil (about 2%) can be added to soften the mixture for ease of working. After grinding, the mixture is introduced into a steam conditioning chamber at from about 85° to about 98° C. to bring the moisture content up to between about 25 to 35% by weight of the mixture. The damp mixture is formed, by minimal expansion extrusion, into relatively homogeneous, feed particles. The conditions of forming are carefully controlled to produce feed particles having a bulk density of above 32 pounds per bushel but preferably from 35 to 42 pounds per bushel. The particles must also be formed in a manner which gives them a smooth texture with a minimum of torn or rough surface projections. The particles are formed into shapes which may have a length of from ⅛ inch to 3 inches. Preferably, the particles should be formed into shapes having rounded edges, such as small cylinders or rounded ovals. The particular shapes should have mean statistical diameters between 0.15 and 0.6 inches.

The statistical diameter of the particles is determined by the method of Martin and a mean is taken by analyzing a random sample of the product. (cf. *Small Particle Statistics*, G. Herdan and M. L. Smith, chapter 5, pages 61–98.) A sufficiently large sample is taken so that the standard error of the mean is within ±0.01.

The process of this invention may be practiced on a conventional extrusion device. The rotating screw of the extruder device creates a high pressure on the material in the extruder. It is believed that the particulate material fed in changes form until it finally flows in a generally fluid manner, even squeezing around the outer periphery of the screw in a recirculating fashion, to cause a severe mechanical working of the substance. Part of the pressure is caused by the screw. Part of the pressure is due to the high temperatures which result both from friction between the flowing product and components of the extruder and from heat that is purposely added to the outside of the extruder, if under normal operation. This added heat is preferably obtained by passing steam and/or water through a forward or front annular jacket within the extruder housing around, but separate from, the foward end of the extruder chamber. Steam may also be added directly into the extruder to increase the temperature of the material and/or to raise the moisture content of the material, if desired. The amount of heat applied is controlled by typical valving techniques in a manner to obtain temperatures which are not sufficiently high so as to cause the product to scorch or burn, but which are sufficiently high to cause the desired chemical and physical reactions within the material. The amount of added heat to do this will vary with the particular extruder construction, but can be readily determined by trial and error during the initial stages of operation of the equipment.

In addition to the steam jacket for adding heat, an annular cooling jacket surrounds the rear portion of the extruder chamber. This has been found desirable in normal operation to maintain lower temperatures in the initial stages of operation.

The moisture content and grind of the damp material and the temperatures and pressures of extrusion must be selected in a manner to produce an extruded product which will have the desired properties. The particular, the bulk density of the extruded material must be above about 32 pounds per bushel, preferably, about 35 to 42 pounds per bushel and most preferably 38 pounds per bushel after the product has been dried to a moisture content of about 10 to 12% by weight.

The extrudate, after processing, forming and cutting, is then uniformly coated with vegetable oil to form the final product. In spite of the fact that hot liquid animal fat is ordinarily equivalent to vegetable oil as a coating on other extruded products, it has no utility in the applicants' extruded horse feed. Only vegetable oil is suitably palatable to horses as a coating on the applicants' extruded product. The explanation is not apparent at this time. The vegetable oils of the present invention are, for example, corn oil, soybean oil, safflower oil, cottonseed oil or peanut oil. Soybean oil is preferred. The oil is applied in an amount of from about 2% to about 10% by weight of the final product but preferably 4%. The coating may be applied by spraying weighed batches or as part of a continuous process with any appropriate metering device. The spray coating, if desired, may be followed by or even substituted by a period of oil blending to insure uniformity. Spray coating is preferred.

EXTRUSION OPERATION

In operation, the farinaceous-proteinaceous fibrous ingredients are ground to a particle size of less than 0.070 inch and dry mixed to a uniform mixture. Enough water is added to the mixture to bring the moisture content of the mix to between about 25 and 35% by weight and the moistened mixture is blended until the moisture is uniformly distributed throughout the mixture.

When the mixture is prepared and ready for the extrusion operation, it is fed into the extruder inlet while the extruder screw is rotated at a substantial speed of, for example, about 150 rmp. During this operation, steam is passed through the forward jacket, and normally, cooling water is passed through the rear jacket. The meal mixture is advanced in the extruder by the screw while its temperature is increased to above about 212°F. (100° C.) by the heat added by the mechanical working friction, and possibly by the chemical changes occurring. Since the screw tends to advance the material faster than it can be passed through the restricted outlet means, the pressure builds up in the extruder, while the product is severely mechanically worked in the extruder. The material is converted to a flowable substance which is forced from the main extrusion chamber, after a retention time of usually 30 to 40 seconds, into the supplemental chamber. The material remains under elevated pressures and temperatures as it is advanced by pressure differential through the extruder to the die outlet nozzle.

As it emerges from the nozzle under the high internal pressures into the much lower atmospheric pressure, the super heated moisture partially flashes off by evaporation to cause product expansion and partial cooling. If the product is being processed properly, it emerges in the form of a continuous elongated expanded member which is severed into individual particles as it emerges by any ordinary cut off means. The product has minimal expansion as opposed to conventional extruded porous feeds which are porous and have a puffed, expanded structure. However, for purposes of applicants' invention, the toasted aroma and flavors of the particles was found to be adequate but artificial flavorings could be used, if desired. The product, as it emerges, is palatable and wholesome.

During the extrusion operation, the temperature and pressure of the extruder is preferably controlled to produce a product which will have the desired bulk density when dried. More specifically, within the pressure and temperature limits of the extrusion process, the conditions of the extruder are controlled to produce a final product which has a bulk density above 32 pounds per bushel, preferably 35 to 42 pounds per bushel, and most preferably 38 pounds per bushel when dried to a moisture content of about 10% by weight. As the temperature of the extrusion material (taken just upstream of the extrusion die) varies between about 115° to 163° C., the pressure of the extruder (taken just upstream of the extrusion die) will vary depending on the temperature utilized. A temperature of about 135° C. is preferred, though the preferred parameters to produce an optimum product may vary somewhat due to the design of the particular extruder used.

As the expanded extruded product leaves the extrusion die, it is cut by conventional cut off means into the desired shape. The cut off, in cooperation with the shape of the die orifice, i.e., square, circular, annular, determines the shape, size, and texture of the product. By using a sharp cut off set very close to the die, it is possible to produce a product with a very smooth surface texture. The speed of the cut off and the die size determine the size of the extruded particles.

It is of particular note with reference to the extrusion of the product, sometimes referred to herein as the feed, that high performance horses have shown a strong preference for pellets sized at less than 3 inches long. It is particularly preferred that the product be cut into pellets having a length of about one-half inch. Out of several shapes which are acceptable such as, for example, star shaped 3/16 inch in diameter, short flat ribbon (⅜ × 3/16 × 1/16 inch), rods (¼ × ⅜ inch) and oat or oval shaped, the preferred shapes for the product are oval shaped (⅜ inch length) and rod shaped (¼ × ⅜ inch).

As a result of the above-described formulation and processing, the available energy consumption of high performance horses can be increased significantly by replacing one-half to all of their normal grain ration with the product of the present invention. The total energy provided by the composite of the above-described ingredients is greater than that of the sum of the energy values of the particular ingredients if added individually. This is evidenced by a considerable number of animal studies.

The following example illustrates the invention but is not intended as a limitation thereof.

EXAMPLE 1

A mixture of 32.5 parts corn, 10 parts wheat, 10 parts wheat middlings, 15 parts soy hulls, 22.9 parts soybean meal and 3.6 parts vitamins and minerals is finely ground with the constituents being uniformly distributed throughout the mixture. The mixture is introduced into the steam conditioner of an extruder wherein 30% moisture by weight is added to the mixture at about 85° C. The mixture is then passed through an extruder at about 130° C. having an oval shaped die adapted to provide particles of ⅜ × ¼ inch length, obtaining thereby a bulk weight of 38 pounds per bushel. The mixture is dried to about 12% moisture by weight of the mixture. Then 6 parts soybean oil is uniformly sprayed onto the pellets.

What is claimed is:

1. An improved method of making a high performance horse feed, said improved method comprising the steps of grinding and extruding at from about 115° to about 163°C. to a bushel weight of about 32 pounds per bushel and a particle size of from ⅛ to 3 inches in length and a mean diameter of from 0.15 to 0.6 inch, a combination comprising, by weight of the combination, from about 35 to 65% farinaceous material selected from the group consisting of wheat, wheat flour, wheat meal by-products and corn from 10 to 30% proteinaceous material selected from the group consisting of soybean meal, soy flour, peanut meal, cottonseed meal and safflower seed meal, from about 5 to 30% fibrous materials selected from the group consisting of soy hulls, cottonseed hulls, and rice hulls and from 3 to 4% nutritional supplements and between about 25 and 35% added moisture based on the weight of the combination; and thereafter drying to about 10% and coating the extruded combination with from 2 to 10% by weight vegetable oil selected from the group consisting of soybean oil, corn oil, safflower oil, cottonseed oil and peanut oil.

2. The method of claim 1 wherein the amount of farinaceous material is from 40 to 50% by weight based on the total weight of the feed.

3. The method of claim 1 wherein the amount of proteinaceous material is from 20 to 25% by weight based on the total weight of the feed.

4. The method of claim 1 wherein the amount of fibrous material is 15% by weight based on the total weight of the feed.

5. The method of claim 2 wherein the extrusion is conducted at 130° C.

6. The method of claim 1 wherein 4% soybean oil is coated onto the product.

7. The method of claim 1 wherein the product is extruded to a bushel weight of from 35 to 42 pounds per bushel.

8. An extruded and vegetable oil coated high performance horse feed having substantially improved available energy supply and palatability, said feed comprising farinaceous material selected from the group consisting of wheat, wheat flour, wheat meal by-products and corn in an amount of 35 to 65% by weight based on the total weight of the feed, further comprising proteinaceous material selected from the group consisting of soybean meal, soy flour, peanut meal, cottonseed meal, safflower seed meal in an amount of from 10 to 30% by weight based on the total weight of the feed, further comprising fibrous material selected from the group consisting of soy hulls, cottonseed hulls, rice hulls in an amount of from about 5 to 30% by weight based on the total weight of the feed, further comprising nutritional supplements selected from the group consisting of vitamin A, D and E, ascorbic acid, biotin, panthothenic, choline, niacin, pyridoxine, riboflavin, thiamine, calcium, phosphorus, NaCl, copper, iron, manganese, iodine, zinc and combinations thereof, in an amount of from 3 to 4% by weight based on the total weight of the feed, further comprising a vegetable oil coating, said oil selected from the group consisting of soybean oil, corn oil, safflower oil, cottonseed oil, peanut oil, in an amount of from 2 to 10% by weight based on the total weight of the feed, and having a bushel weight of about 32 pounds per bushel, a particle size of from ⅛ to 3 inches in length and a mean diameter of from 0.15 to 0.6 inches.

* * * * *

UNITED STATES PATENT AND TRADEMARK OFFICE
CERTIFICATE OF CORRECTION

PATENT NO. : 3,946,115

DATED : March 23, 1976

INVENTOR(S) : Leslie F. Breuer et al

It is certified that error appears in the above-identified patent and that said Letters Patent are hereby corrected as shown below:

After "Inventors:" on the first page of printing, "Leslie F. Brever" should read "Leslie F. Breuer".

Column 1, line 21, "examples" should read "example".

Column 5, line 12, "The" should read "In".

Signed and Sealed this

[SEAL]

Sixth Day of July 1976

*Attest:*

RUTH C. MASON
*Attesting Officer*

C. MARSHALL DANN
*Commissioner of Patents and Trademarks*